United States Patent [19]

Schweiger

[11] 4,199,405
[45] Apr. 22, 1980

[54] SIDE REFLECTOR FOR A HIGH-TEMPERATURE NUCLEAR REACTOR

[75] Inventor: Fritz Schweiger, Hagen, Fed. Rep. of Germany

[73] Assignee: Hochtemperatur-Kernkraftwerk GmbH (HKG) Gemeinsames Europäisches Unternehmen, Hamm-Uentrop, Fed. Rep. of Germany

[21] Appl. No.: 817,741

[22] Filed: Jul. 21, 1977

[30] Foreign Application Priority Data

Sep. 25, 1976 [DE] Fed. Rep. of Germany ....... 2643275

[51] Int. Cl.² ............................................... G21C 5/08
[52] U.S. Cl. ................................... 176/84; 176/58 PB
[58] Field of Search ...................... 176/30, 58 PB, 84

[56] References Cited
U.S. PATENT DOCUMENTS

| 3,157,582 | 11/1964 | Babule et al. ........................... 176/84 |
| 3,247,070 | 4/1966 | Challender et al. ................ 176/84 X |
| 3,296,084 | 1/1967 | Fawcett et al. .......................... 176/84 |
| 3,607,643 | 9/1971 | Paget ...................................... 176/84 |
| 3,781,190 | 12/1973 | Rapier ................................ 176/84 X |
| 3,873,420 | 3/1975 | Statham .............................. 176/84 X |

FOREIGN PATENT DOCUMENTS

| 2010233 | 5/1970 | Fed. Rep. of Germany ............. 176/84 |
| 2354540 | 5/1975 | Fed. Rep. of Germany ...... 176/58 PB |
| 1488088 | 7/1967 | France ...................................... 176/84 |
| 1122991 | 8/1968 | United Kingdom ................ 176/58 PB |

*Primary Examiner*—Peter A. Nelson
*Attorney, Agent, or Firm*—Toren, McGeady and Stanger

[57] ABSTRACT

The invention relates to a graphite side reflector in block form for a gas-cooled high-temperature nuclear reactor. The blocks of the reflector extend radially continuously through the entire reflector wall thickness and recesses are provided in the inner end faces of at least the blocks disposed in the upper region of the reactor core.

9 Claims, 5 Drawing Figures

SIDE REFLECTOR FOR A HIGH-TEMPERATURE NUCLEAR REACTOR

This invention relates to a graphite side reflector in block form for gas-cooled high-temperature nuclear reactors.

In all known gas-cooled high-temperature nuclear reactors, the side reflector surrounding the core is built of graphite blocks, which may be surrounded externally by carbon blocks and for which the most varied dimensions and shapes have already been proposed.

A feature common to all proposals which may be considered for the building of side reflectors is that they consist of two mutually concentric shells of graphite and possibly carbon, each of which is assembled from graphite blocks, the size and form of those blocks which constitute the inner shell being different from, preferably smaller than, those of the blocks constituting the outer shell.

In the AVR reactor, Jülich, both cylindrical shells consist of superimposed rings built of blocks, the rings of the inner graphite cylinder being not only shallower but also formed of a larger number of smaller blocks than the rings of the outer carbon cylinder.

The same is true for the THTR-300, Schmehausen, also to be operated with spherical fuel elements, the block form as such in this case being different from that of the blocks used in the AVR reactor and both shells being of graphite, the graphite being of better quality for the inner shell.

In the other known nuclear reactors of the type of interest here, the side reflector also consists of two shells, adapted in their shape to one another, concentrically one inside the other and assembled of graphite blocks, these shells therefore possessing, in a radial directon at every point, one coaxially extending joint. The same applies to the Dragon reactor, Dorset, GB, to the still shut down nuclear reactor at Peach Bottom, USA, and to the nuclear reactor at Fort Saint Vrain, Colo., USA, described in its construction in "Nuclear Engineering International," December 1969, Vol. 14, Number 163, page 1074. From this literature source it is known that this reactor possesses a honeycomb construction in cross-section, the shape of the graphite blocks provided for the innermost of the two concentric side reflector shells being hexagonal to fit the fuel elements. In this way the result is attained that the inner part of the side reflector, so-called "side-reflector-hexagonal-elements," can be replaced together with the fuel elements, which is also true for the so-called "lifereflector" of the Dragon reactor.

By contrast, the inner graphite cylinder of the reflectors of the first two named reactors—AVR and THTR-300—is designed for the life of the nuclear reactor, it being assumed that no replacement or repair will be necessary. This certainly results in simpler block shapes, but all known structures of graphite blocks suffer from the disadvantage, consequent upon the different shape and larger number of blocks of the inner shell as compared with the outer shell, that considerable manufacturing costs are associated with these differences and also the difficulty and expense of constructing the inner shell is considerably greater than that for constructing the outer side reflector shell, which also has a supporting and stability function. A further quite considerable disadvantage, hitherto accepted as unavoidable, of the known side reflector construction consists in the fact that the vertical joint extending around between the two side reflector shells leads to thermodynamic conditions which imply especially high temperature excursions for the blocks of the inner shell, which consequently must be adapted in size and shape to avoid stress cracks or similar destructive phenomena arising from the superimposed radiation influences. This is especially true also for the AVR and THTR-300, since a replacement of the inner shell of the side reflector in a pebble-bed reactor would render a special apparatus necessary for this purpose alone, quite apart from the fact that replacement would be scarcely acceptable economically, since for this purpose the core would need to be emptied.

The problem underlying the present invention is to create a side reflector of the type initially referred to, which is appreciably more simply constituted in its construction than previous known proposals but nevertheless does not render necessary an exchange or replacement of the blocks during the entire life of the reactor.

In accordance with the invention, in a graphite side reflector for a gas-cooled high-temperature nuclear reactor, the reflector comprises a wall built up from blocks which extend radially continuously through the entire reflector wall thickness and recesses are provided in the inner end faces of at least those blocks which are arranged to be disposed in the upper region of the reactor core.

This form of blocks produces considerable advantage in many respects. Thus, an appreciable saving in time and expense both in the manufacture of the blocks and also in assembling them to form a side reflector is associated with the integral construction of blocks extending through the entire reflector wall thickness. The omission of the aforementioned separating layer extending between the outer and inner shells of the side reflector results in thermodynamically more favourable conditions, which in a surprising manner afford the possibility of utilising the entire graphite material of the side reflector effectively for operation and incorporating it into shutdown processes, in that, in the case of a reactor shutdown, an undisturbed heat transfer can now spread the so-called shutdown heat, which is the concern of our German patent application P 25 16 123 and British patent application No. 13286/76, through the entire reflector volume, so that if the forced cooling of the reactor core should fail the heat flow into the side reflector can take place undisturbed in the radial direction. This results in a surprisingly simple and inherent utilisation of the properties of the graphite, which has the consequence, amongst other things, that for example the time available from the commencement of a fault situation until the intervention of the necessary emergency measures is increased.

By the recesses provided in the inner end faces of the blocks, a completely novel concept for the construction of the side reflectors is offered, in that the initially mentioned differing sizes for the two types of blocks (for the inner and outer shells of the reflector) are no longer required, since in shaping the blocks, especially in regard to the size of the blocks, it is no longer necessary to take into account thermal influences leading to damage and destruction of the blocks. It is well known that the moderating of the fast neutrons leads to damage of the graphite structure, which is associated with a volumetric change of the graphite, which manifests itself, amongst other things depending upon the neutron influence, in a greater or lesser shrinkage or growth of the graphite. The resultant stresses have superimposed upon the the stresses which fluctuate with the particular operating condition, originating from thermal strains due to operational temperature changes, and lead in particular in the inner region of the reflector to overall loading or stressing of the graphite which is very difficult to monitor and detect, and which acts predominantly tangentially and axially to the reactor core, because there is little to impede contraction or expansion of the graphite in the radial direction. As a result of the recesses formed on the inner faces, the aforementioned geometrical changes are not prevented, so that the stress cracks which would otherwise occur and which hitherto could only be counteracted by the double-shell construction comprising blocks with substantially smaller inner end faces for the inner shell, are reliably avoided for the entire working life of the nuclear reactor. The stresses are thereby reduced to such an extent that the side reflector blocks possess a service life which reliably exceeds the working life of the reactor.

The through construction of the comparatively large-volume graphite blocks finally has the additional advantage that the relative movements, caused in the known constructions by thermal effects, of the smaller blocks intended for the inner shell, are substantially reduced relatively to one another and relatively to the large, outer blocks are avoided. The thermal movements can indeed result in the smaller blocks in the inner shell becoming skewed, since the relatively large number of vertical rows of spacings, when summated, can lead to orders of magnitude which permit such a change of position and in particular, in those for the types of reactor which are charged with spherical fuel elements, render a falling out of the wedge-shaped blocks at least in the upper part, that is to say just above the surface of the pebble-bed forming part of the highest loaded region, at least to appear conceivable.

In an advantageous construction, the recesses consist of sets of slits, preferably of a pattern of vertically and horizontally extending, sets of rectilinear slits. This form of the recesses is preferred in that the slits can be made extraordinarily simply, for example can be sawn in the blocks.

Although the spacing between slits is not critical, the higher the neutron flux, the smaller this spacing is made, in order thereby to counteract the higher stresses associated with higher neutron flux levels. The invention is therefore, based upon the concept of simulating comparatively small block dimensions in that region of the blocks which is subjected to especially high stresses by neutron irradiation and thermal influence, as a result of which, as already mentioned, the provision of a substantially larger number of smaller blocks, which are more expensive to make and more time consuming and difficult to install, is dispensed with.

In order still further to facilitate manufacture, the slits of each set are preferably at equal distances one from another. For the two mutually crossing sets of slits, the distances between slits in each can moreover be chosen to be identical, that is to say not only are the spacings between all horizontal slits equal, but also this dimension is the same as the spacing between the vertical slits.

One especially advantageous construction is obtained, if the width and/or depth of the vertical slits is greater than that of the horizontal slits. The result of this is that, in that reflector region which is especially intensively heated by the gamma flux and neutron scatter, a by-pass flow of coolant gas to the reactor core is produced, which will completely cool this region in operation. It is sufficient to provide this differing width and depth construction only in the upper region of the core, that is over a length of about 40 to 50% of the total core height. This then constrains the by-pass flow to turn back into the reactor core and to become mixed with the hotter gas. The arrangement of slits in the end faces of the blocks disposed in the lower, remaining region of the core may be superfluous in certain reactor designs, for example when in a once-through charging method, the neutron flux is considerably reduced in this region.

The aforementioned by-pass cooling during operation is also of importance because as a result, the temperature difference between the hot central zone of the reactor core and the inner face of the reflector is increased and, if the forced cooling should fail but full pressure of the coolant to be retained, a more powerful natural convection inside the reactor core will take place. The gas in the hot central zone then ascends and enters the free space between the surface of the pebble-bed and the top reflector. Here, it will flow radially towards the inner face of the side reflector and, giving up its heat to the reflector, will flow vertically downwards and then radially inwards and finally, becoming again heated up, will ascend into the hot central zone. In this connection it should be mentioned that, if the side reflector should be heated up only by thermal radiation, that is if the cooling should fail with loss of coolant gas, the influence of the temperature manifests itself in the difference of the fourth powers of the temperatures, and here therefore the proposals according to the present invention have an especially advantageous effect.

As already mentioned, the slit width is not a critical parameter, but in nuclear reactors operating with spherical fuel elements, it should be smaller than the diameter of the fuel elements, so that these elements cannot jam in the slits.

It is well known that, for various reasons, in nuclear reactors operating with spherical elements, the objective is not to allow the heap of spheres to reach its maximum packing density. A geometrically uniform packing of spheres is accompanied by disadvantages, which do not need to be discussed in detail here, and has hitherto been prevented by various measures, including for example the choice of differing diameters for the spherical fuel elements or even additional structures to produce an irregular reflector inner face. Within the scope of this invention, there is an especially simple possible way of achieving this end, namely by superimposing a discontinuity pattern upon the sets of slits, this discontinuity pattern being preferably produced by forming one discontinuity on the inner face of each block in the form of a truncated conical depression having a depth less than that of the slits. If the width of slit is suitably chosen, discontinuities are unnecessary.

It has been found in investigations for determining the temperature distribution in the shielding layers of a high temperature nuclear reactor, carried out on the AVR experimental nuclear power plant, that the specific volumetric thermal power from the absorption of gamma radiation falls to 35% in the first 50 mm, and the thermal power from neutron radiation falls by one order of magnitude in the first 200 mm. The last-mentioned depth of penetration therefore in a certain sense constitutes the upper limit of the necessary extent of the slits in the radial direction. In the interests of simplifying production and reducing costs, a slit depth of 20 mm can, however, be regarded as sufficient, since if the permissible stress in the tangential and/or axial direction is exceeded at the base of a slit, both the plane of cracking and also the direction of cracking are predetermined.

The invention leads in a surprising manner to ensuring the service life of the reflector without any replacement beyond the expected working life of the nuclear reactor, so that the blocks can be anchored securely and permanently in their relative positions, because they are of larger volume and there is no longer any need to allow for the possibility of replacement. Moreover, the cost of manufacture and erection of the side reflector is reduced, and the heat absorption of the reflector in hypothetical fault cases is increased and consequently the operating of the reactor in these cases is simplified, since in the reactor core the time needed for reaching the maximum final temperature is prolonged and the maximum end temperature itself is lowered.

Some examples of a side reflector in accordance with the invention are illustrated in the accompanying drawings, in which:

FIG. 2b is a plan on the inner region of the centre block, in the plane of section IIb—IIb in FIG. 2a;

FIG. 3b a plan on the end region of the left block, in the plane of section IIIb—IIIb in FIG. 3a.

Figure 1:
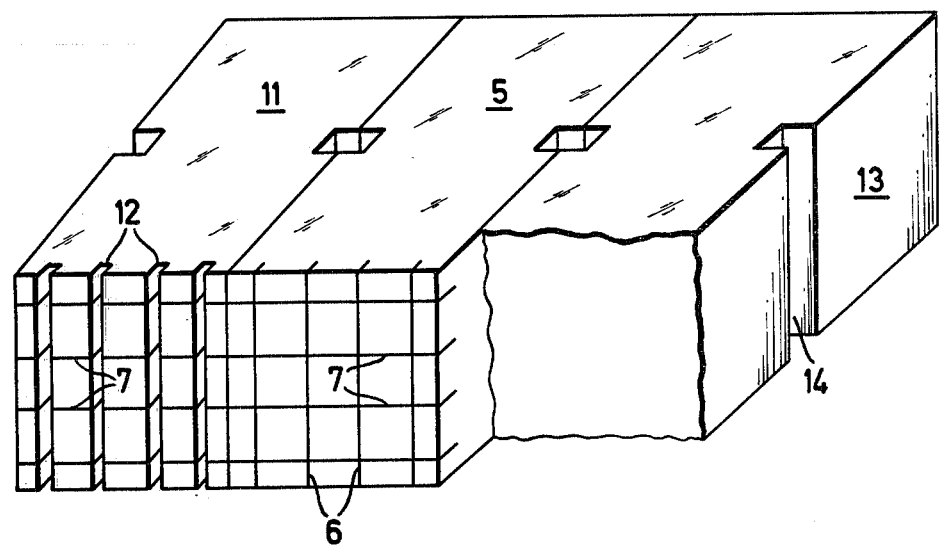
FIG. 1 is a perspective view showing a portion, consisting of three blocks, of a ring formed of a number of blocks laid side by side, which when superimposed form a side reflector, the two left-hand blocks in the figure having different forms of construction, while the right-hand block is shown cut away at the front.

The side reflector is formed of a plurality of layers of superimposed rings, which consist of blocks disposed alongside one another, of which three are shown in FIG. 1. The inner and outer end faces of all the blocks form the preferably cylindrical inner and outer face respectively of the side reflector, which are concentric to each other.

According to FIG. 1, which shows the formation of the inner end face of the blocks in two preferred forms, the vertical side faces of each block, which adjoin the next adjacent blocks, extend in a wedge-shaped pattern towards the centre of the cylinder formed by the side reflector, so that each block as the sector shape of a "piece of cake" with the point cut off. The upper and lower face of each block are plane and parallel.

Figure 2A:
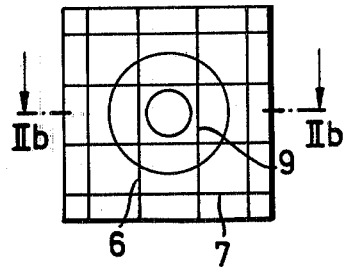
FIG. 2a is an end view on the inner face of the central block shown in FIG. 1 with a discontinuity formed in it.
Figure 3A:
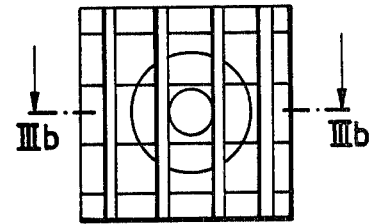
FIG. 3a is an end view on the inner face of the left block in FIG. 1, with discontinuity formed in it.
Figure 2B:
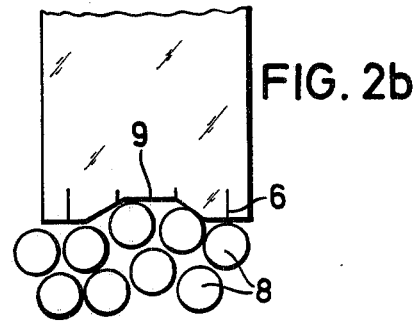
Figure 3B:
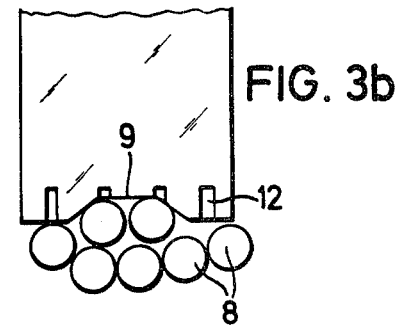

As can be seen especially from FIGS. 2a and 2b, the inner end face of the central block 5 illustrated in FIG. 1 is furnished with two mutually perpendicular sets of slits 6 and 7, which can be made for example by sawing, the width of each slit 6 and 7 being equal to the thickness of the saw blade.

In order, in nuclear reactors charged with spherical fuel elements, to prevent the densest possible packing of the spheres 8, a discontinuity 9 is formed as shown in FIGS. 2a and 2b in the end face of each block 5, centrally placed and superimposed upon the sets of slits 6 and 7, this discontinuity in the example shown having the form of a truncated conical depression. Preferably, the depression extends at a maximum to the base of the slit, which is situated radially outwards between 20 and 200 m from the machined inner end face of the block 5.

The block 11 shown at the left in FIG. 1 differs in the form of its end inner face from block 5, in that the vertical slits 12 extending perpendicularly to the slits 7 are of larger width than the slits 6 and 7, thus producing, amongst other things, the already explained by-pass advantages. In this connection, it is only necessary to emphasise once again that in a form as represented by block 11, the thermal reservoir existing in the side reflector blocks in total is utilised to an optimum extent especially in the case of a shutdown or failure of cooling, since the radiation influences the heat transfer by the difference of the fourth powers of the temperatures, which in the case of this example of embodiment therefore leads to an enormous emission, because, if the cooling is absent, the by-pass rendered possible by the wider vertical slits 12 lead to a comparatively high temperature difference.

As also shown in FIG. 1, vertical grooves 14 are provided in the mutually facing, vertical lateral surfaces 13 of each block, these grooves 14 forming in pairs vertical passages, into which keys for fixing the blocks and interrupting the outwardly radiating, continuous gaps between adjacent blocks, are introduced.

I claim:

1. In a gas-cooled high temperature nuclear reactor having an axially elongated core with the axis of the core extending vertically and with the core having a lower region and an upper region, a graphite side reflector for said core extending in the axial direction thereof, said side reflector comprising an annular wall laterally adjacent to and laterally enclosing the outer surface of said core and having a radially inner surface and a radially outer surface relative to the axis of the core, said wall comprising a plurality of superosed annular layers, each said layer comprising a plurality of blocks with each said block extending continuously in a radial direction of the core from the inner surface to the outer surface of said reflector with each said block having a radially inner face forming a portion of the radially inner surface of said reflector, at least said blocks in said wall enclosing the upper region of said core having recesses extending into the inner face of said block with said recesses extending generally in the direction from the radially inner surface toward the radially outer surfaces of said side reflector, said recess arranged in two sets with the recesses of one set extending transversely across the recesses in the other set.

2. In a gas-cooled high-temperature nuclear reactor, the reflector according to claim 1, comprising a plurality of superimposed layers of blocks joined together to form closed rings.

3. In a gas-cooled high temperature nuclear reactor, the reflector according to claim 1, wherein said two sets of recesses consist of a grating of vertically and horizontally extending sets of rectilinear slits.

4. In a gas-cooled high temperature nuclear reactor, the reflector according to claim 3, wherein said slits of each set are at equal spacings from one another.

5. In a gas-cooled high temperature nuclear reactor, the reflector according to claim 3, wherein at least one of the width and depth of said vertically extending slits, at least of said blocks disposed in said upper core region, is greater than that of said horizontally extending slits.

6. In a gas-cooled high-temperature nuclear reactor, the reflector according to claim 1, wherein said core comprises a plurality of spherical fuel elements, and the width of said slits is smaller than the diameter of said fuel elements.

7. In a gas-cooled high-temperature nuclear reactor, the reflector according to claim 1, wherein the inner face of said blocks have a discontinuity pattern superimposed on said sets of slits.

8. In a gas-cooled high-temperature nuclear reactor, the reflector according to claim 7, wherein said discontinuity pattern comprises one discontinuity in the form of a truncated conical depression having a depth less than that of said slits in said inner face of each said block.

9. In a gas-cooled high-temperature nuclear reactor, the reflector according to claim 1, wherein the depth of each of said slits is between 20 and 200 mm.

* * * * *